United States Patent [19]

Barone

[11] Patent Number: 5,445,012

[45] Date of Patent: Aug. 29, 1995

[54] MARINE IMPELLER TESTER

[76] Inventor: Larry A. Barone, P.O. Box 344, Goodyear, Ariz. 85336

[21] Appl. No.: 253,972

[22] Filed: Jun. 3, 1994

Related U.S. Application Data

[63] Continuation-in-part of Ser. No. 8,474, Jan. 25, 1993, abandoned.

[51] Int. Cl.$^6$ .................................... G01M 15/00
[52] U.S. Cl. ................................. 73/116; 73/714
[58] Field of Search ............... 73/4 R, 4 V, 115, 116, 73/117.1, 714, 740; 116/26, 264–266, 271, 291, 300; 400/2

[56] References Cited

U.S. PATENT DOCUMENTS

| | | | |
|---|---|---|---|
| 2,100,754 | 11/1937 | Seegers | 73/740 |
| 2,227,514 | 1/1941 | Seegers | 73/740 |
| 2,247,102 | 6/1941 | Sugden et al. | 73/740 |
| 3,969,931 | 7/1976 | Lanning | 73/117.1 |
| 4,872,857 | 10/1989 | Newman et al. | 440/2 |

FOREIGN PATENT DOCUMENTS

| | | | |
|---|---|---|---|
| 277473 | 9/1930 | Italy | 73/714 |
| 546083 | 3/1956 | Italy | 116/271 |

*Primary Examiner*—Robert Raevis
*Attorney, Agent, or Firm*—H. Gordon Shields

[57] ABSTRACT

A marine engine is provided with an outdrive unit which incorporates a water impeller to supply water to the marine engine in order to maintain proper engine cooling. Devices are currently available that allow the watercrafts engine to be started when the craft is not in actual service. These devices attach to the crafts outdrive unit and they provide for water, from a household faucet, to be supplied to the water impeller. These devices have no form of measurement to communicate to the operator that a sufficient amount of water is initially being supplied to the water impeller to prevent damage to that component nor do they communicate if the water impeller is capable of producing sufficient suction to feed the crafts engine with sufficient coolant so that the engine will not over-heat when the craft is placed in its operating environment. Wherein, the invention consists of an impeller tester which is placed in existing outdrive water supply devices, or is permanently installed in the water craft. Wherein, the invention will communicate to the operator that a sufficient supply of water is available and the water impeller will not be damaged upon starting the crafts engine. Wherein, the invention also communicates to the operator that the water impeller is functioning properly and is producing sufficient suction to supply the marine engine with sufficient coolant so it will perform without over-heating when the outdrive unit is not supplied with a pressurized water supply.

3 Claims, 1 Drawing Sheet

MARINE IMPELLER TESTER

CROSS REFERENCE TO RELATED APPLICATION

This application is a Continuation In Part application of Ser. No. 08/008,474, filed Jan. 25, 1993, now abandoned.

BACKGROUND OF THE INVENTION

1. Field of the Invention

The field of the invention relates to engines for boats, and more particularly, to a new and improved method of determining if the water impeller, which is located in the outdrive unit, of a marine engine, and which pumps coolant water to the engine from the body of water on which the boat is disposed, is functioning correctly.

The impeller tester provides for the measurement of the inlet and outlet water pressures. These pressures are measured and transmitted through a calibrated gauge for the operator to view and determine if the water impeller has adequate water supply and if the water impeller is functioning properly.

2. Description of the Prior Art

While various devices and components have been utilized in the prior art in allowing the marine engine to be started and run out of water, they have not communicated if the water impeller in the outdrive unit is functioning properly.

Prior state of the art devices are only designed to supply water to the marine engines outdrive unit. These devices allow for a method to attach a standard garden hose from a faucet to the outdrive unit. The amount of water supplied from the faucet is not monitored by these devices and only allows that water be supplied to the marine engine by the water pressure which is available within the municipal water system. A fault of these water supply systems is that they do not indicate if sufficient water pressure is being supplied to safely run the engine, without damaging the water impeller, nor can they determine if the water impeller which is located in the outdrive unit is functioning and capable of pumping non-pressurized water to the marine engine. These devices thereby will allow the engine to function correctly and not over heat when tested out of the water even though the water impeller in the outdrive unit has failed and is no longer capable of pumping ambient water (unpressurized) to the marine engine when the watercraft is put in actual service.

As such, it may be appreciated that there continues to be a need for a new and improved method to monitor water pressures while supplying water to a marine engine when being tested out of water.

The testing of the watercrafts marine engine is done out of water in order to determine if the marine engine is operating properly prior to taking it to an area intended for watercraft use.

Prior state of the art devices allow water to be supplied to the marine engine but do not communicate if the outdrive components are functioning properly. This is due to the water being supplied under pressure. Wherein, water under pressure will supply the engine with sufficient coolant so that it appears to be functioning properly even though the water impeller has failed and will not supply water to the marine engine when the watercraft is put in actual use.

U.S. Pat. No. 2,100,754 (Seegers) discloses a pressure gauge which includes a dual gauge, with one portion of the dial graduated for vacuum pressure and a second portion for positive pressure readings. The dial is adjustable to provide a desired zero reference.

U.S. Pat. No. 2,227,514 (Seegers) discloses another type of pressure gauge in which the dial is also calibrated for vacuum pressure and for positive pressure. The dial is adjustable to provide a desired zero reference.

U.S. Pat. No. 2,247,102 (Sugden et al) discloses a pressure gauge having an adjustable dial.

U.S. Pat. No. 3,969,931 (Lanning) discloses tester apparatus for testing the hydraulic capabilities of an outboard drive assembly.

Italian patent 277,473 (Drager) discloses the coupling of a gauge to a fluid line.

Italian patent 546,083 (Malakoff) discloses the use of a pressure gauge between threaded ends for insertion into a fluid line.

SUMMARY OF THE INVENTION

In view of the foregoing disadvantages inherent in the known methods of supplying water to a marine engine while being tested out of water, the instant invention provides an impeller tester which communicates to the operator that there is sufficient inlet water pressure available and correct outlet vacuum induced by the water impeller. This is necessary if an individual is to insure that the marine engine will be supplied with sufficient coolant when the water impeller is not being supplied with pressurized coolant from a household faucet. As such, the general purpose of the instant invention, which will be described subsequently in greater detail, is to provide a new and improved method of supplying pressurized coolant to a marine engine which has all the advantages of prior art and none of the disadvantages.

The marine engine is equipped with an outdrive unit. This outdrive unit not only incorporates the means to propel the craft by the rotation of the propeller, but it also incorporates a water impeller which provides the means to pump water to the marine engines cooling components while the craft is in service.

Prior state of the art devices are designed to supply water to the outdrive unit in order that the marine engine can be test run when the craft is out of the water prior to taking the craft to the desired recreation area but do not incorporate any method of monitoring if correct initial water pressure is present or if the water impeller is functioning correctly.

One form of the invention consists of a cylinder housing which has a female thread at one end which allows a standard garden hose to be attached. On the other end is a male thread which allows the invention to be attached to existing devices used in supplying pressurized water to the outdrive unit. The invention also incorporates a nipple in its center to provide for the attachment of a calibrated gauge.

The gauge has two calibrated scales which are separated by a zero position between them. On one side of the zero position the gauge is calibrated to read water pressure in PSI and on the other side of the zero position the gauge is calibrated to read Inches of Vacuum. The pressure side of the gauge is to measure the water pressure supplied to the outdrive unit. The gauge is scaled so the operator can adjust the inlet water pressure to a specific value and insure that a sufficient amount of water is being supplied so that the water impeller is not damaged when the marine engine is started. The gauge also incorporates the means to rotate the scale so that after the required water pressure supply is achieved, to prevent damage to the water impeller when the marine engine is started, the gauge can be rotated to the zero position prior to starting the engine. Upon starting the marine engine the second scale of the gauge will communicate to the operator of the water impeller is providing adequate suction (Inches of Vacuum) to supply the engine with coolant.

The gauge is calibrated in two modes to insure that the operator can usually determine by the calibrations on the gauge that sufficient water is initially being supplied and that the water impeller is providing sufficient suction to supply proper coolant to the engine when the craft is put in actual operation and the water impeller is not being supplied by a pressurized water source.

Additional forms of the instant invention include the integration of the means to supply the pressurized water to the outdrive unit in conjunction with the impeller tester being an integral part of the water supplying device. Also, a form of the invention can be installed permanently in the watercraft and display to the operator that the water impeller is providing an adequate water supply to the engine while the craft is in actual use.

My invention resides not in any one of these features but rather in the particular combination of all of these herein disclosed and claimed, and it is distinguished from the prior art in this particular combination of all its structures for the functions specified.

It is therefore an object of the instant invention to provide a new impeller tester which has all the advantages of the prior art and none of the disadvantages.

It is another object of the instant invention to provide a new impeller tester which may be easily and efficiently manufactured and marketed.

It is a further object of the instant invention to provide a new impeller tester which is of a durable and reliable construction.

DESCRIPTION OF THE PREFERRED EMBODIMENT

FIG. 1 is an isometric projection of an impeller tester in accordance with the invention.

FIG. 2 is a front view of a calibrated gauge in accordance with the invention. The gauge is set in the pretest position and water is not being supplied to the crafts water impeller. Also, the cylinder member is attached and is sectioned on each end.

FIG. 3 is a front view of a calibrated gauge in accordance with the invention. All conditions are the same as in FIG. 2 except that water is being supplied to the water impeller. The gauge is indicating the exact amount of water pressure supplied to the water impeller prior to starting the crafts engine.

Arrows in FIGS. 1, 3, 4, and 5 indicate the direction of water flow.

Figure 1:
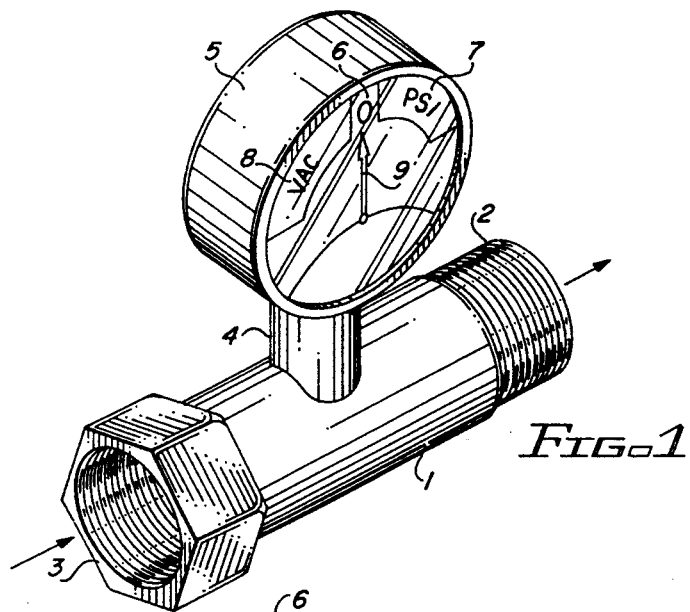
Figure 2:
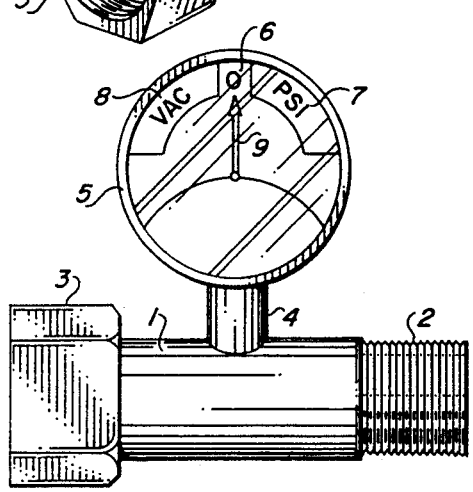
Figure 3:
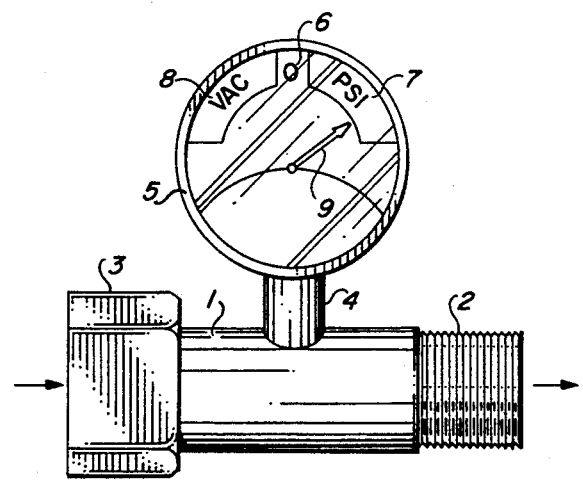

The impeller tester comprises a cylinder member 1, at one end it has a female attachment 3 which allows the impeller tester to be connected to a standard household water faucet by a garden hose. At the opposite end is a male threaded end 2 which attaches to an existing water supply device currently available for supplying coolant to the outdrive, from a standard household water faucet. Also, attached to the cylinder member 1 is nipple 4, wherein, the calibrated gauge 5 is attached to cylinder member 1 (FIG. 1). The calibrated gauge 5 is capable of being rotated to the pre-test zero position 6 which is incorporated within the calibrated gauge 5 (FIG. 2). The calibrated gauge 5, also incorporates the means for the operator to determine the necessary water pressure required for the water impeller by monitoring the reading of pointer 9 on the pressure scale 7 when water is supplied but prior to starting the engine (FIG. 3).

Figure 4:
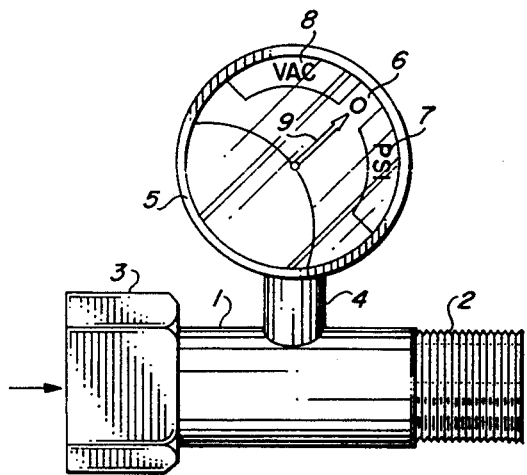
FIG. 4 is a pictorial view of a calibrated gauge in accordance with the invention. All conditions are the same as in FIG. 3, except that the gauge has been rotated clockwise to the zero position.
Figure 5:
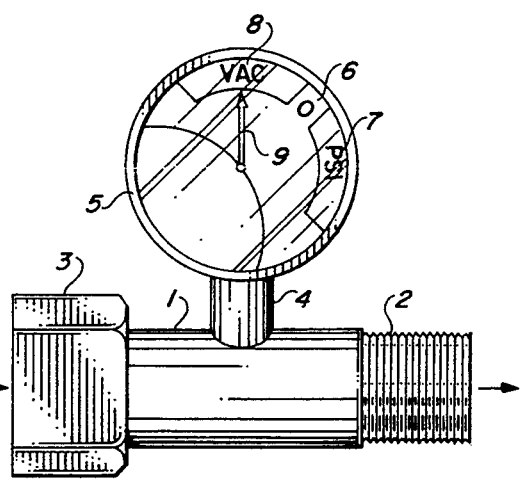
FIG. 5 is a pictorial view of a calibrated gauge in accordance with the invention. All conditions are the same as in FIG. 4 except that the crafts engine is now started and the calibrated gauge is indicating that sufficient vacuum is being produced by the water impeller to insure that sufficient coolant will be supplied to the engine when the craft is put in actual operation.

After the water impeller is supplied with an adequate water supply, as specified on scale 7 within the calibrated gauge 5, the gauge is then rotated to the zero position 65 within the calibrated gauge 5 (FIG. 4). At this time the marine engine is then started. The operator can then observe from the vacuum scale 8, within the calibrated gauge 5, if sufficient vacuum is being produced by the water impeller to supply the marine engine with proper coolant during its normal operation. This will be determined by the operator observing the indication of pointer 9 within vacuum scale 8 (FIG. 5). If pointer 9 reads the appropriate scale value within vacuum scale 8 then the required vacuum is present to insure that the water impeller is operating properly and will supply the marine engine with sufficient coolant to allow for safe operation when the craft is put in its intended environment.

There has thus been outlined, rather broadly, the more important features of the instant invention in order that the detailed description thereof that follows may be better understood, and in order that the present contribution to the art may be better appreciated. There are, of course, additional features of the instant invention that will be described hereinafter and which will form the subject matter of the claims appended hereto. Those skilled in the art will appreciated that the conception, upon which this disclosure is based, may readily be utilized as a basis for the designing of other structures, methods and systems for carrying out the several purposes of the instant invention. It is important, therefore, that the claims be regarded as including such equivalent constructions insofar as they do not depart from the spirit and scope of the instant invention.

What I claim is:

1. A water impeller tester for a marine engine, comprising a cylindrical member 1 including
a first end having means 3 for connecting the member 1 to a water source, and
a second end having means 2 for fluidly connecting the member to the water impeller of a marine engine;

a pressure gauge fluidly connected between the first and second ends of the cylindrical member, said gauge including both a rotatable indicating face 5 that further includes a pressure scale 7, vacuum scale 8, and zero marker 6 between the two scales, and rotatable pointer 9 that permits pressure readings to be taken from the scales;

the rotatable face 5 providing a means to zero the gauge with respect to the pressure scale 7 prior to supplying water to the impeller;

the pressure scale 7 and zero marker 6 providing a means for an operator to assure that a sufficient amount of water is being supplied to the water impeller prior to starting the marine engine;

the rotatable face 5 providing a means to zero the gauge with respect to the vacuum scale 8 after the sufficient amount of water is assured;

the vacuum scale 8 and zero marker 6 providing a means to determine if sufficient vacuum is being produced by the water impeller immediately after the marine engine is started.

2. Tester apparatus for testing a water impeller of a marine engine comprising in combination:

a member for receiving a flow of water;

a first portion on the member for connecting to the flow of water;

a second portion on the member for connecting to the water impeller of the marine engine;

a pressure gauge connected to the member between the first and second portions and responsive to the pressure of the water flowing through the member, including a pointer movable in response to the pressure of the water flow, and a rotatable indicating face having a vacuum scale, a positive pressure scale, and zero position between the two scales and rotatable to zero the gauge after the flow of water has been connected to the member and prior to starting the engine to determine the vacuum pressure of the flow of water due to the impeller of the engine after the engine is started.

3. Apparatus for testing an impeller of a marine engine outdrive unit comprising in combination:

a cylinder;

an input connector on the cylinder for providing a flow of water to the cylinder before the marine engine is started;

an output connector on the cylinder for connecting the flow of water to the impeller of the marine engine outdrive unit;

a gauge connected to the cylinder for indicating the pressure of the flow of water;

a pointer on the gauge responsive to the pressure of the flow of water; and a rotatable dial on the gauge having a vacuum pressure indication, a positive pressure indication, and a zero indication between the vacuum pressure and positive pressure indications for zeroing the pointer of the gauge after the flow of water has been provided and prior to starting the engine for testing the impeller of the engine by responding to the pressure of the flow of water after the marine engine is started to determine if sufficient vacuum pressure is indicated on the dial in response to the starting of the engine.

* * * * *